(12) United States Patent
Wuthrich

(10) Patent No.: US 8,434,776 B2
(45) Date of Patent: May 7, 2013

(54) BICYCLE FRAME WITH REAR SUSPENSION SYSTEM

(76) Inventor: Andy Wuthrich, Crans-Montana (CH)

( * ) Notice: Subject to any disclaimer, the term of this patent is extended or adjusted under 35 U.S.C. 154(b) by 105 days.

(21) Appl. No.: 13/198,875

(22) Filed: Aug. 5, 2011

(65) Prior Publication Data

US 2012/0038130 A1 Feb. 16, 2012

(30) Foreign Application Priority Data

Aug. 16, 2010 (EP) .................................... 10008516

(51) Int. Cl.
*B62M 9/12* (2006.01)

(52) U.S. Cl.
USPC ............................. 280/261; 280/283; 474/117

(58) Field of Classification Search .................. 280/259, 280/261, 283, 284; 474/117
See application file for complete search history.

(56) References Cited

U.S. PATENT DOCUMENTS

| | | | | |
|---|---|---|---|---|
| 2,976,056 A * | 3/1961 | Henry | ............................. | 280/277 |
| 4,069,719 A * | 1/1978 | Cancilla | ......................... | 474/134 |
| 6,155,585 A * | 12/2000 | Busby | ............................ | 280/261 |
| 7,097,190 B2 * | 8/2006 | Matsumoto et al. | ........ | 280/281.1 |
| 2005/0176538 A1 * | 8/2005 | Morita | ........................... | 474/136 |
| 2005/0236804 A1 * | 10/2005 | Alonzo | .......................... | 280/284 |
| 2006/0068954 A1 * | 3/2006 | Kaga et al. | ....................... | 474/74 |

FOREIGN PATENT DOCUMENTS

| | | |
|---|---|---|
| GB | 2 338 216 A | 12/1999 |
| WO | 2008/025950 A1 | 3/2008 |

OTHER PUBLICATIONS

European Search Report, dated Dec. 21, 2010, from corresponding European application.

* cited by examiner

*Primary Examiner* — Kevin Hurley
(74) *Attorney, Agent, or Firm* — Young & Thompson

(57) ABSTRACT

A shock absorbing bicycle frame includes a front frame unit connected to a bottom bracket shell by which the drive tension is applied to a drive chain, a rear wheel swing arm attached to the front frame unit at a single pivot point and presenting a mounting end to receive a rear axle of a rear wheel. The distance between the mounting end and the bottom bracket shell is variable over the full rear wheel travel. The frame further includes a rear wheel suspension assembly including a compressible shock absorbing unit connecting the rear wheel swing arm to the front frame unit and a chain unit pivotably mounted on the front frame unit, rigidly connected to both the rear wheel swing arm and to the drive chain to maintain the drive chain length over the full rear wheel travel so that the shock absorbing unit is not affected by pedalling forces due to the rider pedalling, the pedalling forces being then not wasted.

10 Claims, 3 Drawing Sheets

BICYCLE FRAME WITH REAR SUSPENSION SYSTEM

The present invention relates generally to bicycles especially of the types mountain bike or downhill bike and more particularly to a bicycle frame with a rear suspension system.

A conventional bicycle frame typically consists of two triangles: a main or front triangle and a paired rear triangle. The front triangle typically includes a top tube and a down tube both connected to a head tube, a seat tube connected to the top tube and a bottom bracket shell connected to the seat tube and the down tube. The rear triangle typically includes a pair of chain stays connecting the bottom bracket shell to the rear axle of a rear wheel and a pair of seat stays connected to the chain stays and to the seat tube.

A variety of rear wheel suspension systems have been used on bicycle frames to improve performance and rider's comfort.

In some known rear suspension assemblies, such as the one described in U.S. Pat. No. 6,361,059, the rear axle pivots around a single point when subjected to bump or shock forces, as when traversing rough terrain. In these designs, the rear suspension assembly is affected by the pedalling forces which are exerted by the rider and some of the rider's energy is needlessly wasted.

This effect occurs due to the common tendency of rear suspension systems to either lock up or "squat" when the rider pedals. Since most of these systems have a single lever arm which pivots around a single axis, the lock up or squat generally occurs as a result of chain tension acting on the single lever arm. If the single pivot line is above the chain line, the suspension will typically lock up, thereby providing compliance only when the shock or bump forces exceed the chain tension. Conversely, if the single pivot point of the suspension system is below the chain line, the system will typically squat when the rider accelerates, since the chain tension is acting to compress the suspension, similar to a shock or bump force.

Therefore, there are two constraints in the development of rear suspension systems: on one hand, the centre distance between the bottom bracket shell and the rear axle must be constant over the full wheel travel in order to avoid chain lengthening, and on the other hand, the pivot point of the rear triangle (swing arm) of the bicycle frame must be in line with the upper chain line.

The more recent rear suspension assemblies, such as the one described in U.S. Pat. No. 6,206,397, present multiple pivot points so that the real pivot point of the rear axle becomes virtual and shifts so as to define a complex curve which is followed by the rear wheel as the suspension is actuated. However, such suspension systems are complicated structures involving a plurality of frame members and joints increasing the manufacturing costs and affecting the stiffness of the bicycle frame.

It is therefore the object of the present invention to provide a bicycle frame having a rear wheel suspension system which addresses the shortcomings mentioned above.

The present invention relates to a shock absorbing bicycle frame comprising a front frame unit connected to a bottom bracket shell by which the drive tension is applied to a drive chain, a rear wheel swing arm attached to the front frame unit at a single pivot point and presenting a mounting end to receive a rear axle of a rear wheel, the distance between the said mounting end and the bottom bracket shell being variable over the full rear wheel travel, characterised in that it further comprises a rear wheel suspension assembly comprising a compressible shock absorbing unit connecting the rear wheel swing arm to the front frame unit so that to absorb the vertical force applied to the rear axle of a rear wheel due to irregularities of the ground and a chain unit pivotably mounted on the front frame unit, rigidly connected to both the rear wheel swing arm and to the drive chain in order to maintain the drive chain length over the full rear wheel travel and the full variation in the distance between the mounting end of the rear wheel swing arm and the bottom bracket shell, so that the shock absorbing unit is not affected by the pedalling forces due to the rider pedalling, the said pedalling forces being then not wasted Other features and advantages of the present invention will become apparent in the following detailed description of one embodiment of the invention, with reference to the accompanying drawings, in which:

Figure 1:
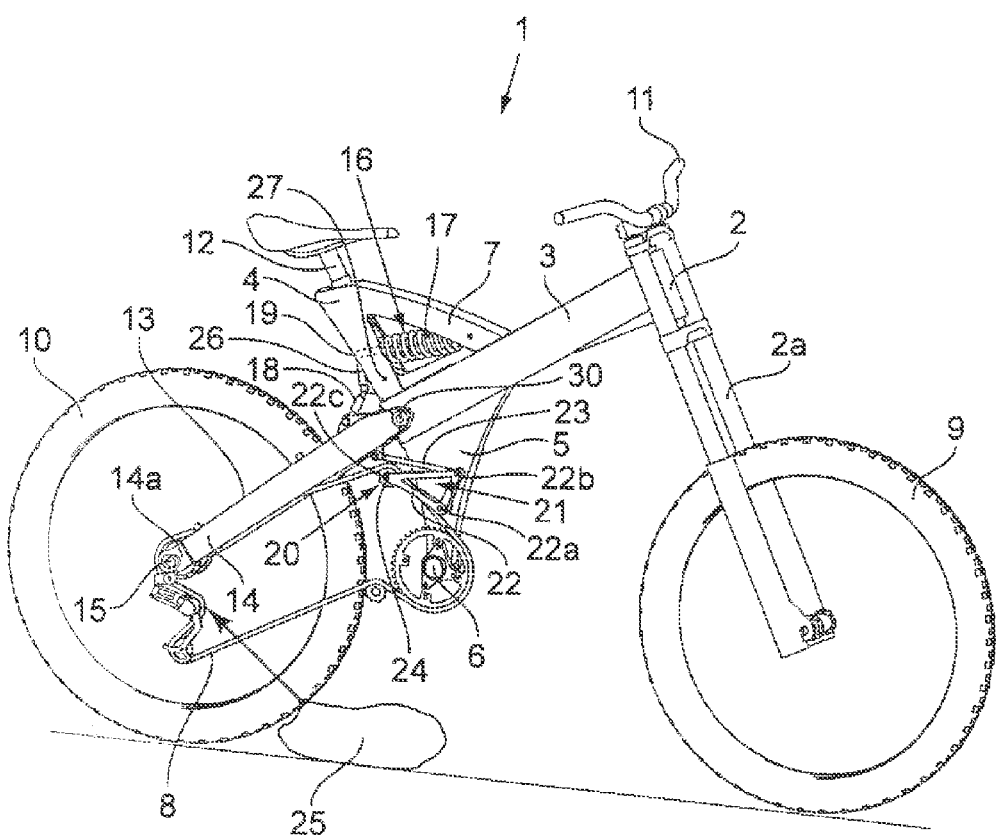
FIG. 1 is a side view of the bicycle frame according to the invention in a preferred pedalling position.
Figure 2:
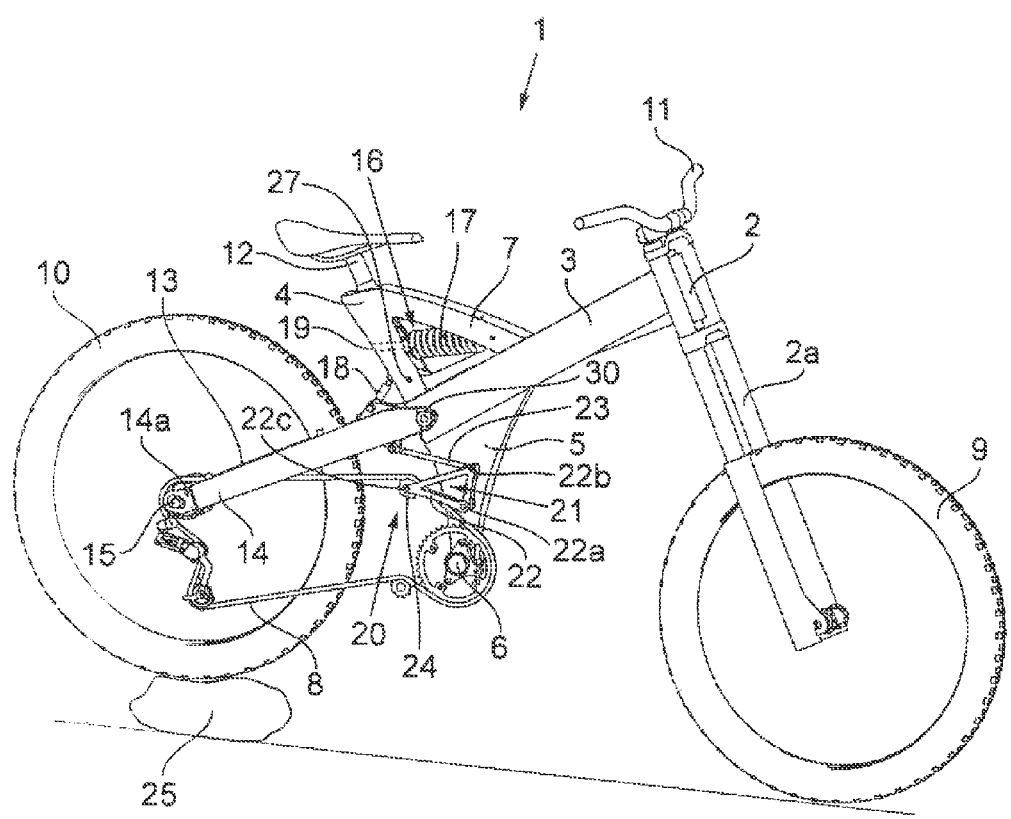
FIG. 2 is a side view of the bicycle frame shown in FIG. 1 while riding on an irregularity of the ground.

Referring to FIG. 1, a bicycle frame 1 according to the present invention generally and preferably comprises a head tube 2, a top tube 3, a seat tube 4, a bottom triangle 5, a bottom bracket shell 6 and a rear wheel suspension assembly 20. These elements are typically welded or otherwise secured together to define the frame of the bicycle.

The head tube 2 extends as usual in an essentially vertical direction and supports a front fork assembly well known to the person of ordinary skill in the art. The seat tube 4 extends in an essentially vertical direction essentially parallel to the head tube 2 and supports the rider's mass. The top tube 3 extends rearwardly from the head tube 2 to the seat tube 4. A connecting tube 7 further connects the seat tube 4 to the top tube 3.

The bottom triangle 5 connects the top tube 3 to the bottom bracket shell 6. The said bottom bracket shell 6 extends in a horizontal direction and receives a conventional crankset (i.e. pedals, crank arm, crank shaft, chain ring(s) and associated components known to the person of ordinary skill in the art, not shown in the drawing) by which the drive tension is applied to the drive chain 8. As used in this description and the appended claims, the term drive "chain" includes not only bicycle chain but also drive belt, toothed belt and similar power transmission devices.

Although partially shown in the drawings, the person of ordinary skill in the art will understand that the bicycle frame has attachment fittings for the following components: front wheel 9 and rear wheel 10, handle bars 11 and seat assembly 12.

The rear wheel suspension assembly 20 generally comprises a rear wheel swing arm 13 pivotably attached to one end of the top tube 3. In the embodiment of the present invention, the rear wheel swing arm consists of a pair of rear wheel stays 14 which have a first rear mount end 14a that is adapted for mounting a rear axle 15 of the rear wheel 10 and which extend forwardly to be pivotably connected to one end of the top tube 3 at a single pivot point 30. Preferably, the stays are positioned on either side of the rear wheel 10. However, alternative embodiments are possible, such as for example, a single rear wheel stay positioned on only one side of the rear wheel 10.

The rear wheel stays 14 may include known elements such as element to secure cables, brake mounts, rear derailleur mounts . . . .

The rear suspension assembly 20 further comprises a shock absorbing unit 16 having an elastically deformable damping shock absorber 17. As shown in the drawings, the shock absorber 17 has an adjustable air/oil damping system and an adjustable coil spring, although it is clearly understood to the person of ordinary skill in the art that the shock absorber may be of any suitable type.

The shock absorbing unit 16 is connected to both the connecting tube 7 and the rear wheel swing arm 13. In this purpose, the shock absorbing unit 16 has a first push rod 18 which extends upwardly from the rear wheel swing arm 13 and is connected to a first end of a lever 26. The lever 26 is pivotably mounted on the seat tube 4 at a pivot point 27 and pivots in an opening 19 of the said seat tube 4. The other end of the lever 26 is connected to the lower end of the shock absorber 17.

The impact force applied to the bicycle frame when the bicycle is ridden over uneven ground is damped by virtue of deformation of the shock absorber 17.

The rear wheel suspension assembly 20 finally comprises a chain unit 21. The chain unit 21 preferably includes an essentially triangular chain member 22 pivotably mounted at a first apex 22a on the bottom triangle 5 of the bicycle frame 1. The chain unit 21 further comprises a second push rod 23 which extends downwardly from the rear wheel swing arm 13 and which is mounted to a second apex 22b of the chain member 22. The third apex 22c of the chain member 22 supports an intermediate sprocket 24 for guiding the drive chain 8. The chain unit 21 rigidly connects the drive chain 8 to the rear wheel swing arm 13. In this embodiment, the chain member 22 is pivotably mounted on the bottom triangle 5 in a way that permits the drive chain 8 to pass between the said bottom triangle 5 and the chain member 22 and to be guided by the sprocket 24.

Having provided a detailed description of the components of the bicycle frame 1 according to the present invention, the motion which these components cooperate to provide will now be described in detail.

The basic forces which are applied to the rear wheel suspension assembly 20 are the following:
1. the mass of the rider which creates a vertically downward force on the seat tube 4 and bottom bracket shell 6;
2. the pedal force applied by the rider which creates a vertically downward force and/or torque about the bottom bracket shell 6 which applies a forward force to the rear wheel 10 as result of drive chain tension;
3. the combined force of the shock absorber 17 (spring and damper) which are upward on the bicycle frame 1 and downward on the rear wheel axle 15;
4. the vertical ground input (represented by a rock 25 in the figures) which creates a slightly backward and/or upward force on the rear wheel axle 15. This force is represented by an arrow in FIG. 1.

The purpose of the invention is to isolate the last force from the first three, that is to isolate the "pedal forces" from the "ground forces", in such a way that the shock absorbing unit 16 will not compress/extend due to pedal forces which are exerted by the rider, but will remain compliant to uneven ground 25.

The rear suspension assembly 20 of the present invention leads to a variation of the distance between the bottom bracket shell 6 and the rear wheel axle 15 over the full rear wheel travel. In many prior art suspension, this effect happens indifferently and uncontrollably over the full rear wheel travel and the suspension travel and is therefore undesirable, because it causes the bicycle to "back-pedal" when the rear wheel 10 moves vertically due to the uneven ground 25. However, the chain unit 21 of the present invention maintains the chain length over the full rear wheel travel and therefore counteracts the effect due to the variation of the distance between the bottom bracket shell 6 and the rear wheel axle 15.

Indeed, without the chain unit 21, the forward force applied to the rear wheel 10 as a result of the chain tension due to the pedal force applied by the rider would actuate/extend the shock absorbing unit 16, which would then be less efficient to accommodate the uneven ground 25.

With the chain unit 21 according to the invention, the chain tension due to the pedal force applied by the rider exerts a downward force on the chain member 22 of the chain unit 21 which pivots and exerts thus via the second push rod 18 a rearward force to the rear wheel swing arm 13 compensating the forward force to the rear wheel 10 due to the chain tension. The shock absorber 17 is neither compressed nor extended and remains in a state in which it can fully accommodate the uneven ground.

Unlike the bicycle frame of the prior art having a single pivot point rear suspension assembly and an essentially fixed upper chain line, the upper chain line of the bicycle frame according to the invention varies over the full rear wheel travel due to the chain unit 21. The pivot point 30 of the rear wheel swing arm 13 according to the present invention is no more required to be in a particular precise position compared to the chain line, such as required in the prior art. The chain unit 21 prevents as previously mentioned the bicycle frame 1 to squat and the shock absorber 17 to lock up which are common drawbacks of the prior art. In particular and preferably, the pivot point 30 of the rear wheel swing arm 13 is positioned high enough vertically so that an impact pulls in the optimal angle of 90° against the shock absorber 17 (see the angle between the arrow representing the impact force and the swing arm 13 in FIG. 1).

Figure 3:
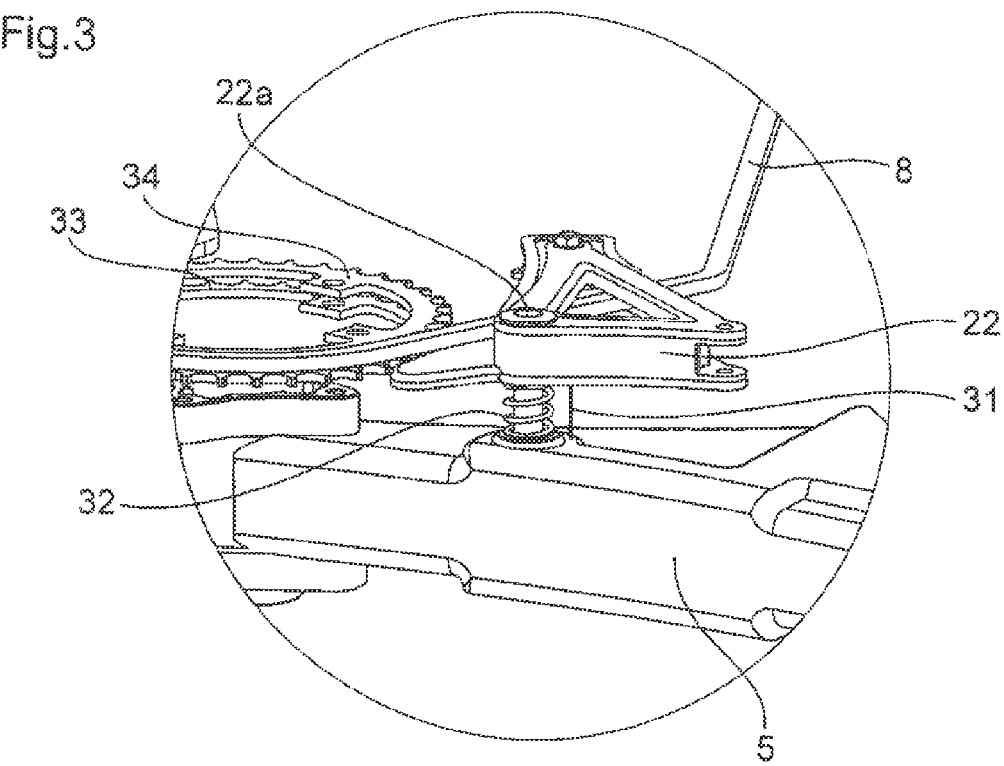
FIG. 3 is an enlargement of a chain unit of a variant of a bicycle frame according to the invention in a first position.
Figure 4:
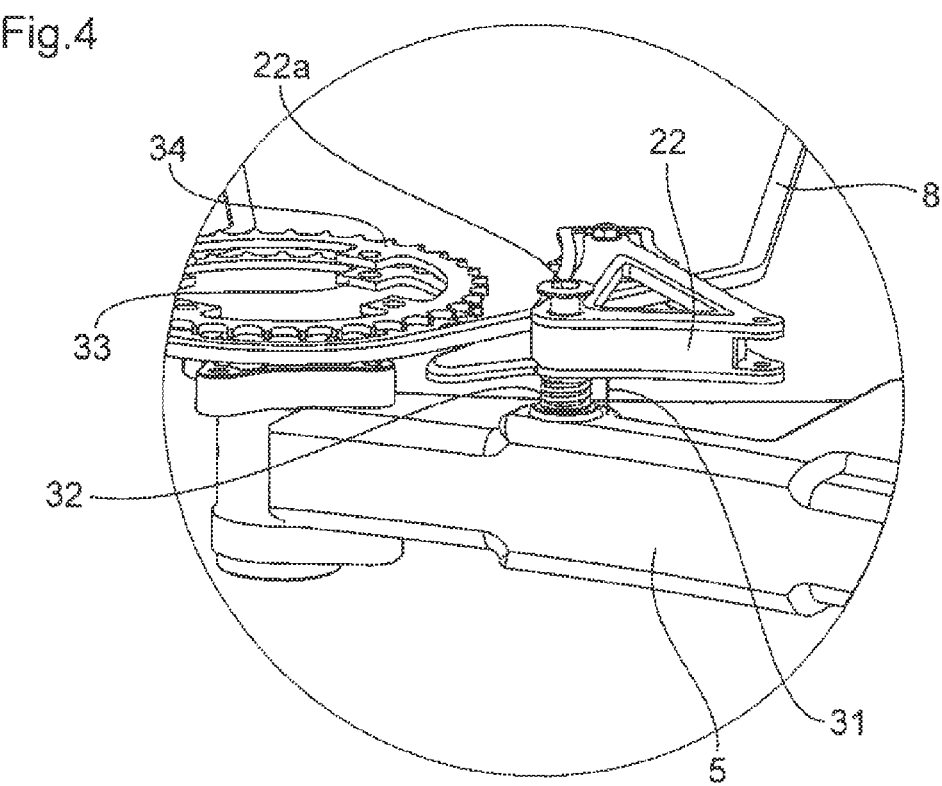
FIG. 4 is an enlargement of the chain unit shown in FIG. 3 in a second position.

In a variant of the described embodiment illustrated in FIGS. 3 and 4, the chain unit 21 can be built to also serve as front derailleur if the bicycle has multiple front sprockets 33, 34. The chain 8 is guided by the chain unit 21 so as to be maintained on the selected sprocket. For example, FIG. 3 shows the chain unit 21 in a first position maintaining the chain 8 on a first sprocket 34 and FIG. 4 shows the chain unit 21 in a second position maintaining the chain 8 on a second sprocket 33. The chain unit 21 pivots as it is described in the main embodiment around the first apex 22a of the chain member 22. In this variant, the chain unit can also be translated along an axis passing through the apex 22a and essentially perpendicular to the chain member 22. The chain unit 21 can then be moved by a traditional gear shifter mounted on the handle bar of the bicycle frame and actuating a cable 31 connected to the chain unit and acting against a spring 32 in a manner well known to the person of ordinary skill in the art.

Persons of ordinary skill in the art will understand that for purposes of this invention, the bicycle frame 1 can incorporate a number of other elements and features without departing from the intended scope of the invention.

It will also be understood that numerous modifications to and variations on these mechanisms such as the chain unit or the shock absorbing unit will occur to those having ordinary skill in the art and it should be understood that such will fall within the scope of the present invention.

The various components of the invention may be manufactured in a wide variety of ways and from a wide variety of materials, all of which will be readily understood by persons of ordinary skill in the art.

The invention claimed is:
1. A shock absorbing bicycle frame (1) comprising a front frame unit (2, 2a, 3, 4, 5, 7) connected to a bottom bracket shell (6) by which the drive tension is applied to a drive chain (8), a rear wheel swing arm (13) attached to the front frame unit (2, 2a, 3, 4, 5, 7) at a single pivot point (30) and presenting a mounting end (14a) to receive a rear axle (15) of a rear wheel (10), the distance between the said mounting end (14a) and the bottom bracket shell (6) being variable over the full rear wheel travel, characterised in that it further comprises a rear wheel suspension assembly (20) comprising a compressible shock absorbing unit (16) connecting the rear wheel swing arm (13) to the front frame unit (2, 2a, 3, 4, 5, 7) so that to absorb the vertical force applied to the rear axle (15) of a rear wheel (10) due to irregularities (25) of the ground and a chain unit (21) pivotably mounted on the front frame unit (2, 2a, 3, 4, 5, 7), rigidly connected to both the rear wheel swing arm (13) and to the drive chain (8) in order to maintain the drive chain length over the full rear wheel travel and the full variation in the distance between the mounting end (14a) of the rear wheel swing arm (13) and the bottom bracket shell (6), so that the shock absorbing unit (16) is not affected by the pedalling forces due to the rider pedalling, the said pedalling forces being then not wasted.

2. Shock absorbing bicycle frame according to claim 1, characterised in that the chain unit (21) comprises an essentially triangular chain member (22) pivotably mounted at a first apex (22a) on the front frame unit (2, 2a, 3, 4, 5, 7), a push rod (23) extending from the rear wheel swing arm (13) and mounted to a second apex (22b) of the chain member (22) and a sprocket (24) pivotably mounted on a third apex (22c) of the chain member (22) and guiding the drive chain (8).

3. Shock absorbing bicycle frame according to claim 1, characterised in that the pivot point (3) of the rear wheel swing arm (13) and the shock absorbing unit (16) are positioned so that an impact on the frame due to irregularities (25) of the ground exerts a perpendicular force on the said shock absorbing unit (16).

4. Shock absorbing bicycle frame according to claim 1, characterised in that the chain unit (21) comprises a chain member (22) pivotably mounted on the front frame unit (2, 2a, 3, 4, 5, 7), a push rod (18) rigidly connecting the chain member (22) to the rear wheel swing arm (13) and a sprocket (24) mounted on the chain member (22) and guiding the drive chain (8).

5. Shock absorbing bicycle frame according to claim 1, characterised in that the chain unit (21) further serves as a front derailleur.

6. Shock absorbing bicycle frame according to claim 2, characterised in that the pivot point (3) of the rear wheel swing arm (13) and the shock absorbing unit (16) are positioned so that an impact on the frame due to irregularities (25) of the ground exerts a perpendicular force on the said shock absorbing unit (16).

7. Shock absorbing bicycle frame according to claim 2, characterised in that the chain unit (21) comprises a chain member (22) pivotably mounted on the front frame unit (2, 2a, 3, 4, 5, 7), a push rod (18) rigidly connecting the chain member (22) to the rear wheel swing arm (13) and a sprocket (24) mounted on the chain member (22) and guiding the drive chain (8).

8. Shock absorbing bicycle frame according to claim 2, characterised in that the chain unit (21) further serves as a front derailleur.

9. Shock absorbing bicycle frame according to claim 3, characterised in that the chain unit (21) further serves as a front derailleur.

10. Shock absorbing bicycle frame according to claim 4, characterised in that the chain unit (21) further serves as a front derailleur.

* * * * *